United States Patent [19]

Mims

[11] Patent Number: 4,957,622

[45] Date of Patent: Sep. 18, 1990

[54] APPARATUS FOR REMOVING SEDIMENT FROM PONDS

[75] Inventor: Ken Mims, Lake Monroe, Fla.

[73] Assignee: Uddo-Mims International, Inc., Edgewater, Fla.

[21] Appl. No.: 220,592

[22] Filed: Jul. 18, 1988

[51] Int. Cl.[5] .............................................. B01D 21/00
[52] U.S. Cl. ...................................... 210/170; 37/56; 37/59; 37/61; 37/66; 210/242.1
[58] Field of Search ................... 210/86, 97, 170, 173, 210/241, 242.1, 523, 525, 747, 768, 803, 805; 37/54, 57, 59, 64–66, 71, 73, 189, 195, 58, 61, DIG. 8, 67, 56, 68

[56] References Cited

U.S. PATENT DOCUMENTS

| | | | |
|---|---|---|---|
| 3,210,017 | 10/1965 | Nordell | 210/173 |
| 3,333,704 | 8/1967 | McGivern et al. | 210/242.1 |
| 3,659,712 | 5/1972 | Chaplin | 210/242.1 |
| 3,796,658 | 3/1974 | Meissner | 210/170 |
| 3,807,560 | 4/1974 | Pentz et al. | 210/803 |
| 3,967,393 | 7/1976 | Nixon | 37/58 |
| 4,307,525 | 12/1981 | Malablocki | 37/65 |
| 4,324,056 | 4/1982 | Sommerfield | 37/189 |
| 4,401,576 | 8/1983 | Meurer | 210/525 |
| 4,470,208 | 9/1984 | Van Berk et al. | 37/195 |
| 4,658,751 | 4/1987 | Koot | 37/73 |
| 4,776,112 | 10/1988 | Urbani | 210/242.1 |

FOREIGN PATENT DOCUMENTS

| | | | |
|---|---|---|---|
| 0111029 | 5/1987 | Japan | 37/61 |
| 0158244 | 10/1978 | Netherlands | 37/58 |
| 0897970 | 1/1982 | U.S.S.R. | 37/58 |
| 0950864 | 8/1982 | U.S.S.R. | 37/58 |
| 1040057 | 9/1983 | U.S.S.R. | 37/58 |
| 1170067 | 7/1985 | U.S.S.R. | 37/58 |

Primary Examiner—Frank Spear
Assistant Examiner—Joseph Drodge
Attorney, Agent, or Firm—Frijouf, Rust & Pyle

[57] ABSTRACT

An apparatus and method for removing sediment which has settled on the bottom of a pond comprising a frame and a hydrostatic chamber. The hydrostatic chamber includes an aperture to receive the sediment and water proximate the bottom of the pond. A gate controls the size of the opening of the aperture formed in the hydrostatic chamber thereby regulating the ratio of sediment to water entering the hydrostatic chamber. An underwater motive means moves the apparatus along the bottom of the pond causing a wiper to extend into the sediment for scraping, loosening, wiping and plowing the sediment from the bottom of the pond and for directing the bottom sediment toward the aperture upon movement of the frame by the motive means. A vent is used to vent the hydrostatic chamber while a pump is in fluid communication with the hydrostatic chamber to create a pressure differential thereby forcing into the hydrostatic chamber the sediment and fluid proximate the aperture. This sediment and fluid is pumped out for disposal away from the pond.

11 Claims, 3 Drawing Sheets

APPARATUS FOR REMOVING SEDIMENT FROM PONDS

BACKGROUND OF THE INVENTION

1. Field of the Invention

The invention relates to an appratus for cleaning a settling pond and more particularly for removing sediment from the bottom of a settling pond without removing large amounts of water.

2. Description of Prior Art

Numerous devices for removing sediment from settling ponds, lakes, streams, lagoons, and the like are known in the prior art. Such devices create a suction vacuum in the material to be removed. The problem with this type of device, is that the bottom is stirred up creating cloudy or muddy water the sediment of which later settles onto the area previously cleaned. Also, a large amount of pond water is taken along with the sediment resulting is a low ratio of dry tons sediment removed to total volume (water and sediment) removed. If the pond is lined, the suction vacuum may injure the liner thereby destroying or markedly lowering its effectiveness.

It is a primary object of this invention to provide an apparatus which overcomes the aforementioned difficulties of the prior art devices and provides an improvement which is a substantial contribution to the advancement of the removal of bottom sediment in the pond cleaning art.

It is another object of this invention to provide an apparatus to remove sediment from the bottom of a pond while minimizing the disturbance of the bottom sediment into the clear water above the sediment layer.

It is another object of this invention to provide an apparatus which removes the sediment from the bottom of a pond and transports the removed sediment away from the cleaned pond.

It is another object of this invention to provide an apparatus which removes the settled sediment from a settling pond while minimizing the amount of water required to aid in the removal of the sediment.

It is anpther object of this invention to provide an apparatus which includes a wiper means with scrapes, loosens, plows and wipes the sediment from the surface of the liner and protects the liner from suction vacuum injury.

It is another object of this invention to provide an apparatus which provides a high solids content in the slurry effluent removed from the settling pond.

It is another object of this invention to provide an apparatus which removes a predetermined thickness of a sediment layer by manipulating the depth of the wiper means into the sediment layer.

It is another object of this invention to provide an apparatus which efficiently removes lime sludge, sewage treatment sludge, algae, sludge, and the like without a need for draining the pond or filtering large volumes of water.

It is another object of this invention to provide an apparatus which can effectively operate in ponds having long sloped walls.

It is another object of this invention to provide an apparatus which may be controlled by manipulating a gate means, a motive means and a pump means to form a slurry from the sediment accumulating on the bottom of a pond.

It is another object of this invention to provide an apparatus which can be manipulated to control the ratio of sediment removed to water removed from the pond thereby controlling the viscosity of the slurry comprising the sediment and a portion of water pumped from the pond.

It is another object of this invention to provide an apparatus which removes accumualted sediment from ponds provided with sand bottoms while limiting the amount of sand bottom removed with the sediment.

It is another object of this invention to provide an apparatus which provides a wiper means which cushions the pond sand bottom or liner from impacts with the apparatus during manipulation of the apparatus.

It is another object of this invention to provide an apparatus which includes a hydrostatic chamber which forms a slurry of sediment and water resulting in a decreased volume of water and sediment removed from the pond bottom for disposal.

An advantage of the instant invention is that it removes sediment from the top of a permeable liner without causing it to float.

A further advantage of the instant invention is that it forms a concentrated mixture of bottom sediment and water thereby reducing the disposal volume by manipulating a gate means and/or a motive means and/or a pump means.

The foregoing has outlined some of the more pertinent objects of the present invention. These objects should be construed to be merely illustrative of some of the more pertinent features and applications of the invention. Many other beneficial results can be obtained by applying the disclosed invention is a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

This invention is defined by the appended claims of the specific embodiment shown in the attached drawings. For the purpose of summarizing the invention, the invention may be incorporated into a device and process comprising an apparatus and method for removing a layer of sediment material which has settled on the bottom of a pond or the like.

The apparatus comprise a frame having a first end and a second end. A hydrostatic chamber which includes a first end and a second end is positioned proximate the first end of the frame. The first end of the hydrostatic chamber includes an aperture formed therein for receiving in use sediment and water proximate the bottom of the pond as the apparatus moves along the bottom the pond. A gate means control the size of the aperture formed in the hydrostatic chamber thereby regulating the volume of water and sediment entering the hydrostatic chamber. The gate means also aid in regulating the ratio of sediment to water entering the hydrostatic chamber. A motive means is utilized to move the apparatus along the bottom of the pond. Preferably the apparatus includes a wiper means extending in use into the sediment for scraping, loosening, plowing and wiping the bottom sediment proximate the aperture upon movement of the frame by the motive means. A vent means vents the hydrostatic chamber to permit in use a flow into the hydrostatic chamber of sediment and water positioned proximate the aperture formed in the hydrostatic chamber. A pump means includes an inlet port providing suction and an outlet port providing discharge. The inlet port of the pump means is in fluid communication with the hydrostatic chamber to create in use a pressure lower in the hydrostatic chamber relative to the pressure exterior to the hydrostatic chamber thereby forcing into the hydrostatic chamber the sediment and fluid proximate the aperture such that an inflow turbulence is formed within the hydrostatic chamber to form a slurry comprising the bottom sediment and water. The outlet port of the pump means removes the slurry formed in the hydrostatic chamber for disposal away from the pond.

Preferably, the hydrostatic chamber is positioned in front of the first end of the frame such that the aperture formed in the hydrostatic chamber may be operatively positioned in use below the first end of the frame thereby preceding the frame as the frame moves along the bottom of the pond to enhance the removal of sediment above the bottom of the pond. The hydrostatic chamber is preferably sealed except for the aperture to prevent the loss of sediment and water which has been forced into the hydrostatic chamber and excess water invasion during use. If the apparatus of the invention is not to be immersed beyond the second end of the hydrostatic chamber such that water would enter the top of the chamber, the top of the hydrostatic chamber may be open thereby providing a vent means. In the event the apparatus of the invention is to be immersed in the pond the second end of the hydrostatic chamber is sealed and provided with a vent means to permit flow of the sediment and water proximate the aperture into the hydrostatic chamber. Once suction is formed in the hydrostatic chamber by the pump means, the vent means are not necessary for operation of the apparatus. Other vent means include a conduit which extends to the atmosphere, a gas release valve to release the air held within the hydrostatic chamber and pump means, or the like. The function of the vent means is to permit the pump means to be primed.

Preferably, the apparatus of the invention includes a first articulating means for enabling the hydrostatic chamber to move vertically relative to the frame thereby enabling an upward and downward manipulation of the aperture of the hydrostatic chamber relative to the bottom of the pond.

The apparatus of the invention preferably includes a second articulating means for enabling the first end of the frame to pivot relative to the second end of frame. This enables side-to-side movement of the first end of the frame relative to the second end of the frame and permits the apparatus to perform tight turning maneuvers. Preferably the first and second articulating means are hydraulic rams.

The motive means for moving the apparatus along the bottom of the pond is, preferably, a four wheel drive carriage secured to the frame. Preferably, the wheels are driven by a compressed air motor or hydraulic motor by a drive train known to those skilled in the art. In the preferred embodiment, a floating barge will carry a diesel driven air compressor or hydraulic pump to drive the wheels and the pump on the apparatus and a control station for manipulating the apparatus on the pond bottom. This arrangement allows the apparatus to easily follow the contour of the bottom of the pond. Other motive means include the securing of a tow bar to the frame to enable the apparatus of the invention to be pulled along the bottom of the pond by a cable connected to the tow bar and to a cable winding apparatus. The forward motion of the apparatus in combination with the wiper means moves the sediment toward the aperture where there is an inward rush by the sediment and water created by the lower pressure within the hydrostatic chamber. The gate means controls the amount of sediment and water being pressured into the hydrostatic chamber by regulating the size of the aperture receiving the sediment and water. In use the sediment layer extends along the bottom of the aperture with the water above the seidment layer. By closing the gate means which preferably closes the aperture from the top, down toward the bottom of the aperture, the ratio of sediment to water can be optimized to form a slurry having a higher viscosity than otherwise possible. A turbulent motion within the chamber combines water and sediment to form a slurry which is pumped to from the pond to a disposal area.

The aperture formed at the first end of the hydrostatic chamber receives in use the sediment and water proximate the bottom of the pond as the apparatus moves along the bottom the pond. Preferably, the aperture formed in the hydrostatic chamber extends across the entire face of the hydrostatic chamber to provide a wide path of sediment removal.

The gate means controls the size of the aperture formed in the hydrostatic chamber. Preferably, the gate means is a hydraulically operated door which is capable of moving across the entire aperture of the hydrostatic chamber. Most preferably, the door moves upward and downward across the entire length of the aperture to maintain the wide path of sediment removal as the apparatus moves along the bottom of the pond. By controlling the size of the aperture the ratio of sediment and water within the hydrostatic chamber is regulated. Thus, given the same thickness of sediment entering the aperture, the more the door is closed, the higher the viscosity of the slurry.

The wiper means is preferably positioned below the aperture formed in the hydrostatic chamber and extends in use downwardly into the sediment layer to be removed. As such the wiper means is adjacent and below the aperture. Most preferably, the resilient wiper extends coextensively with the aperture formed in the hydrostatic chamber and is attached to the hydrostatic chamber. This enables simultaneous movement of the wiper means and the hydrostatic chamber upon activation of the first articulating means thereby enabling the wiper means to be pushed downwardly throught the sediment layer until the actual bottom of the pond or liner is reached. The actual bottom of the pond is ascertained by a noticeably increased resistance to the downward movement of the wiper blade or direct observation of the thickness of the layer of sediment. The wiper means plows, scrapes, loosens and wipes the bottom sediment of the pond proximate the aperture upon movement of the apparatus by the motive means. The wiper means cleans the bottom of the pond and directs the bottom sediment toward the aperture formed in the hydrostatic chamber. Preferably, the wiper means is a resilient rubber wiper blade although a stiff sponge or the like will suffice depending on the nature of the sediment to be removed. The size of the wiper blade may be varied. For example, the width can be selected according to the thickness of the layer of sediment to be removed.

In the preferred embodiment, the pump means is a hydraulically driven pump.

Sediment includes any settable material which settles onto the bottom of a pond and the like and includes sand, sludge, coal fines, fly ash and the like and interfers with the intended operation of the pond be it a natural pond or an artificial pond. Also included as sediment are aquatic algae and the like which collect on the bottom of ponds, especially percolating ponds and interfere with the rate of percolation. Ponds requiring periodic cleaning include solar reflection ponds, waste water retention ponds, reservoirs and the like. In time such sediment lessens the capacity of the pond necessitating its removal. In some cases a liner is placed over the bottom of a pond to provide containment. In those cases where the sediment must be removed from the surface of the liner in order to retain capacity of the pond or for any reason, the apparatus of the invention removes the sediment without injuring the liner.

The invention also includes a method for removing a layer of sediment formed on the bottom of a pond. The method comprises providing a sediment removing apparatus which includes a frame having a first end and a second end and a hydrostatic chamber having a first end and a second end. An aperture is formed in the first end of the hydrostatic chamber and a gate means controls the size of the aperture formed in the hydrostatic chamber. A motive means powers the apparatus along the pond bottom. Preferably, a wiper means is secured to the first end of the hydrostatic chamber proximate the bottom of the aperture and extends into the sediment layer. A pump means is used with an inlet port and an outlet port with the inlet port of the pump means in fluid communication with the hydrostatic chamber. A vent means vents the hydrostatic chamber.

A process of removing a layer of sediment from the bottom of a pond comprises positioning the apparatus on the bottom of a pond with a layer of sediment on the bottom of the pond such that the aperture is proximate the sediment layer at the bottom of the pool in order to receive the sediment layer in use. Preferably a wiper means is used which extends into the depth of the sediment layer. The air is vented from the hydrostatic chamber and the pump means to permit the pump means to form a suction upon activation of the pump means. The pump means is activated to create a pressure lower in the hydrostatic chamber relative to the pressure exterior to the hydrostatic chamber. The extent the aperture is open is regulated by manipulating the gate means. The motive means is activated and the suction of the pump means and the rate of forward progress of the apparatus along the bottom of the pond are regulated to cause the wiper means to scrape, loosen, plow and wipe the sediment toward the aperture thereby forcing into the hydrostatic chamber the sediment and water proximate the aperture such that an inflow turbulenece is formed within the hydrostatic chamber to form a slurry comprising the bottom sediment and water. The slurry formed in the hydrostatic chamber is discharged by directing the outlet port of the pump means to a disposal area away from the pond.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 is a front view of the apparatus of the invention with the hydrostatic chamber in a down position;

FIG. 3 is a side view of the apparatus of the invention with the hydrostatic chamber in a down position;

FIG. 4 is a side view of the apparatus of the invention with the hydrostatic chamber in an up position;

Similar reference characters refer to similar parts throughout the several views of the drawings.

DETAILED DISCUSSION

Figure 1:
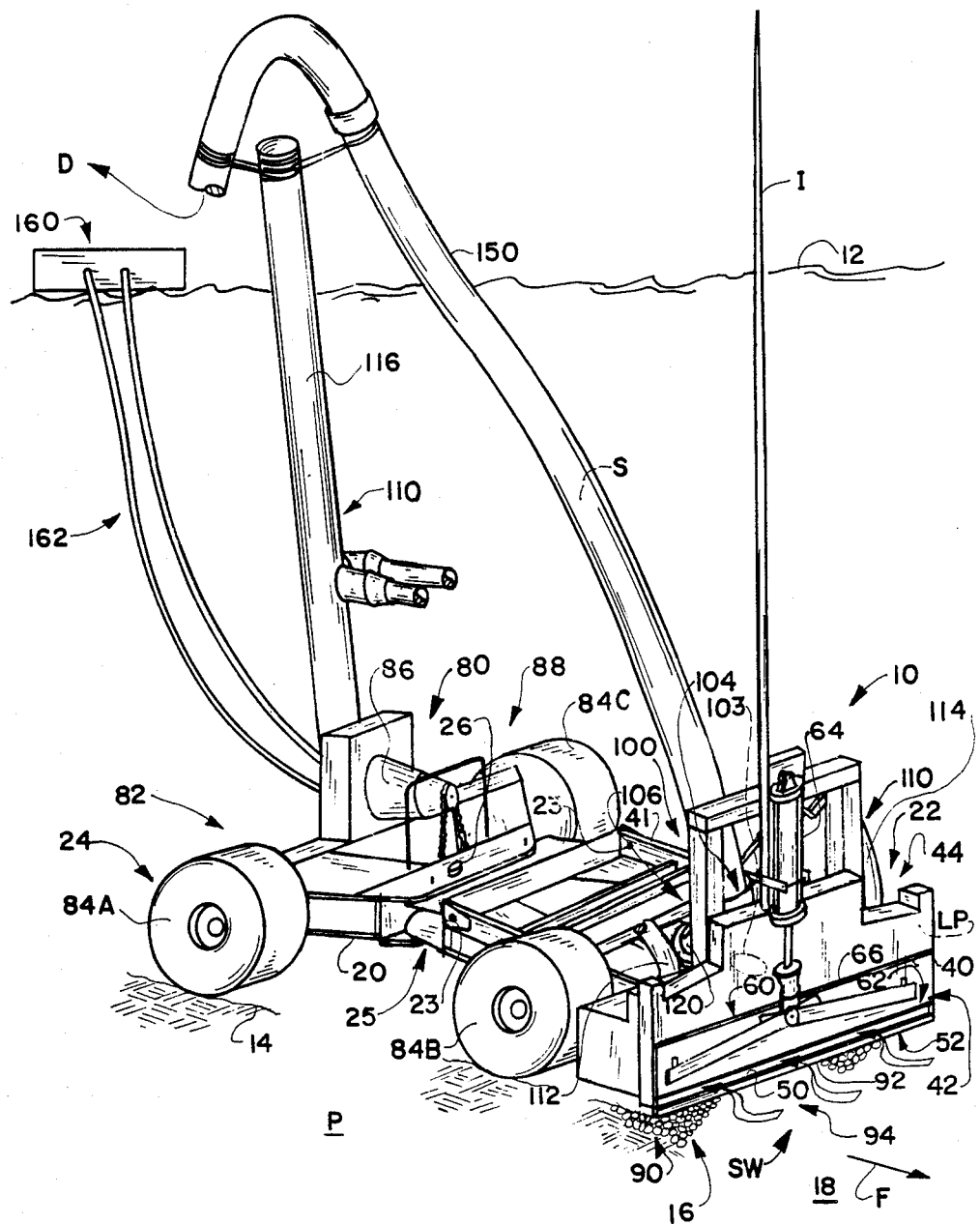
FIG. 1 is an isometric view of the apparatus of the invention in a working environment.

FIG. 1 illustrates the apparatus of the invention 10 in a working environment for removing a layer of sediment 16 which has settled on the botom 14 of a pond 12. The apparatus 10 comprises a frame 20 with a first end 22 and a second end 24. A hydrostatic chamber 40 with a first end 42 and a second end 44 is positioned proximate the first end 22 of the frame 20. In use the first end 22 of the frame 20 moves in a forward direction F along the bottom 14 of the pond 12. The first end 42 of the hydrostatic chamber 40 includes a aperture 50 formed therein for receiving in use sediment 16 and water 18 from the bottom 14 of the pond 12 as the apparatus moves in a forward direction. The hydrostatic chamber 40 provides a conduit for conveying the slurry formed therein to the input port 102 of the pump means 100. A gate means 60 controls the size 62 of the aperture 50 formed in the hydrostatic chamber 40. The gate means 60 regulates, in part, the ratio of sediment to water removed from the bottom 14 of the pond 12.

A motive means 80 moves the apparatus 10 in use along the bottom 14 of the pond 12. Preferably, the motive means 80 includes a plurality 82 of pool 12 bottom 14 engaging wheels such as 84A, 84B, 84C and 84D. The preferred source of power for the motive means 80 is a hydraulic motor 86 which powers at least one wheel and preferably all the pool bottom engaging wheels such as 84A, 84B, 84C and 84D. Preferably, a wiper means 90 extends downwardly from aperture 50 of the hydrostatic chamber 40. At this location the wiper means in use extends into the sediment 16 layer at the bottom 14 of pond 12 and scrapes, loosens, plows and wipes the bottom 14 sediment 16 and aids in directing the sediment 16 into the aperture 50 upon forward movement of the apparatus 10 by the motive means 80.

A pump means 100 includes an inlet port 102 and an outlet port 104. Preferably, the input port 102 (FIG. 6) of the pump means 100 in fluid communication with the hydrostatic chamber 40 is positioned at the second end 44 of the hydrostatic chamber 40 through a hole 103 formed on the second end 44 of chamber 40 such that the aperture 50 is distally spaced apart from the input port 102 to enhance, in use, an even pressure drop along the aperture 50 formed in the hydrostatic chamber 40. Thus the aperture 50 of the hydrostatic chamber 40 is formed in the first end of chamber 40 below the input port 102 which is operatively positioned in the second end of the hydrostatic chamber 40 to enhance the turbulent action in use.

A vent means 110 vents in use the hydrostatic chamber 40 to the atmosphere. This enables a fluid flow into the hydrostatic chamber 40 of sediment and water positioned proximate the aperture 50 formed in the hydrostatic chamber 40 by allowing air trapped in chamber 40 and pump means 100 to escape. The flexible conduit 112 and 114 are in fluid communication with the second end 44 of the hydrostatic chamber 40 and with open conduit 116 which extends above the level of pond 12. In FIG. 1, flexible conduits 112 and 114 are partially illustrated to clarify the figure. In use, the level of water in open conduit 116 will be lower than the level of the pond 12. In the event that water 18 is not flowing through aperture 50 because of blockage or the like, water in conduit 116 will be drawn into chamber 40.

Once the apparatus is positioned at the bottom 14 of the pond 12, the level of water in conduit 116 will be essentially the level of the pond 12. This ensures water invasion into the hydrostatic chamber 40 and pump means 100 thus priming pump means 100 upon activation. Preferably, the vent means 110 are positioned proximate the position of the input port 102 of the pump means 100 in the hydrostatic chamber 40. The inlet port 102 of the pump means 100 is in fluid communication with the hydrostatic chamber 40 to create in use a pressure lower "LP" in the hydrostatic chamber 40 relative to the pressure exterior "P" to the hydrostatic chamber 40. This enables the exterior pressure "P" to force into the hydrostatic chamber 40 the sediment 16 and water 18, indicated by solid arrows "SW", throughout the entire area 52 of the aperture 50 as determined by the positioning of the gate means such that an inflow turbulence is formed within the hdyrostatic chamber 40 to form a slurry "S" comprising the bottom sediment 16 and water 18. The outlet port 104 of the pump means 100 removes the slurry formed in the hydrostatic chamber 40 for disposal (schematically indicated as "D") away from the pond. A conduit 150 is in fluid communication with the outlet port 104 to direct the slurry to the disposal area "D". The pump means 100 is preferably a hydraulically driven pump 106. Such pumps are known in the art and provide suction at an input port 102 and a discharge of matter drawn in by the suction at the input port 102 by an output port 104.

Preferably, the apparatus 10 includes a first articulating means 120 to enable the hydrostatic chamber 40 to move vertically relative to the frame 20. This enables an upward (FIG. 4) and downward (FIG. 3) manipulating of the hydrostatic chamber 40 and the wiper means 90 and the aperture 50 thereof.

Figures 2, 3, 4:
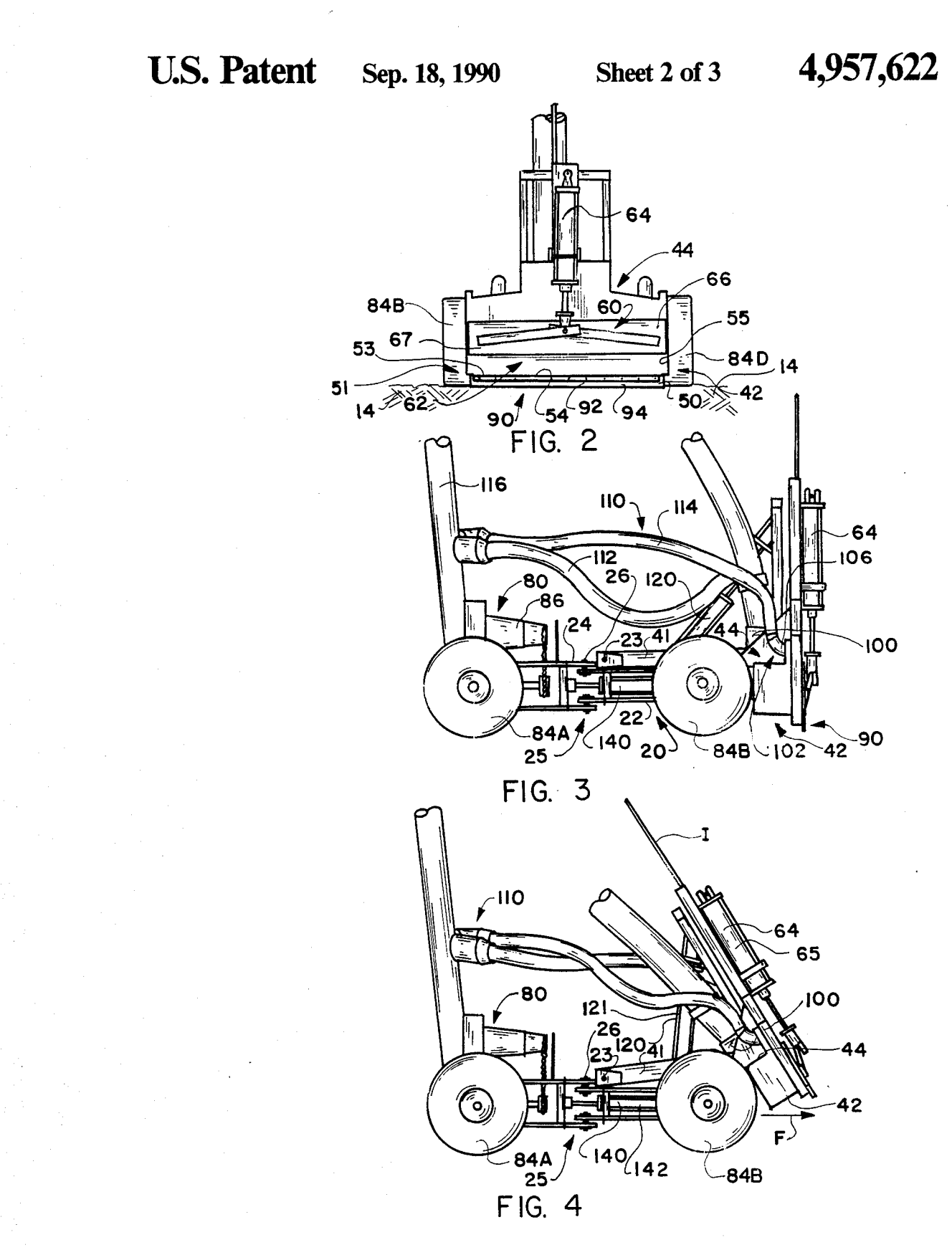

The wiper means 90 is preferably secured to the hydrostatic chamber 40 below the aperture 50 formed in the hydrostatic chamber 40 to enhance the movement of the sediment 16 to toward the aperture 50 by scraping, loosening, plowing and wiping the sediment 16 from the bottom 14 of the pond. Once removed from the bottom 14 of the pond 12 the sediment is directed by the wiper means 90 toward the aperture 50 formed in the hydrostatic chamber 40 where the sediment is captured in a fluid flow maintained by the lower pressure LP within the hydrostatic chamber 40 relative to the external pressure P in the pond 12. Preferably, the aperture 50 formed in the hydrostatic chamber 40 is rectangular in shape 51 such that in use a long side 53 of the rectangular shape 51 is substantially parallel to the bottom of the pond in use, as illustrated at FIG. 2. In the preferred embodiment, the wiper means 90 is a resilient wiper 92 which extends coextensively 94 with the rectangular shaped 51 aperture 50 formed in the hydrostatic chamber 40.

The motive means 80 includes a four wheel carriage 88 secured to the frame 20. Preferably, each wheel of the four wheel carriage 88 is powered. Such motive means, and others, are known to those skilled in the art.

FIG. 2 illustrates the apparatus of the invention with the hydrostatic chamber 40 in a down position.

The gate means 60 controls the size 62 of the opening of aperture 50 formed in the hdyrostatic chamber 40 and therefore the extent of suction along the aperture for a given suction generated by pump means 100. Preferably, the gate means 60 includes a hydraulically 64 operated door 66 which may be raised or lowered thereby widening or narrowing, respectively the opening of aperture 50. It is the combination of the amount of suction of the input port 102 of the pump means which forms the lower pressure "LP" in chamber 40, the size 62 of the opening of the aperture 50 and the rate of forward movement of the apparatus along the bottom of the pond which controls the viscosity of the slurry formed in the lower portion of the hydrostatic chamber 40. Preferably, the gate means 60 controls the size 62 of the aperture 50 formed in the hydrostatic chamber by increasing or decreasing the width 55 of the aperture 50.

FIG. 3 illustrates a second articulating means 140 enables the first end 22 of the frame 20 to pivot relative to the second end 24 of the frame 20. The enable frame 20 to pivot, frame 20 is preferably hinged 26.

In a preferred embodiment the hydrostatic chamber 40 is positioned in front of the first end 22 of the frame 20 such that the aperture 50 formed in the hdyrostatic chamber 40 and the wiper means 90 may be manipulated in use by the first articulating means 120 to below the first end 22 of the frame 20 to enhance the removal of sediment 16 from the bottom 14 of the pond 12. This enables the wiper means 90 to be positioned at the bottom 14 of the pond 12 and extend into the sediment layer 16 to be removed from the bottom 14 of the pond 12. Preferably, the plurality of wheels 82 follow the movement of the hydrostatic chamber across the bottom of the pond, in use to prevent "packing" of the sediment layer which may make it harder to remove from the bottom 14 of the pond 12.

Preferably, the inlet port 102 of pump means 100, which is fluid communication with the hdyrostatic chamber 40, is operatively positioned in the second end 44 of the chamber 40 with the aperture 50 formed in the first end 42 of chamber 40. This enables a more turbulent mixing action within the hyrostatic chamber 40 between the first end 42 and second end 44 of the chamber 40.

In the preferred embodiment illustrated at FIG. 1, a floating barge 160 will carry a diesel driven air compressor or hydraulic pump (not shown) to drive the wheels and the pump on the apparatus and a control station (not shown) for manipulating the apparatus on the pond bottom. Partially illustrated hydraulic lines (or air lines) 162 extend from barge 160 to hydraulic pump 106 and motor 86 and to the first and second articulating means 120 and 140. This arrangement allows the apparatus to follow the contour of the bottom of the pond.

FIG. 3 illustrates a side view of the apparatus of the invention. Pivot means 25 such as hinge 26 enables the first end 22 of the frame 20 to pivot relative to the second end 24. The hydrostatic chamber 40 in a down position. This positions the aperture 50 formed in the hydrostatic chamber 40 near the bottom 14 of the pond 12 and the wiper means 90 into the sediment layer 16 which is to be removed. An indicating pole "I" is positioned at the first end 22 of frame 20 which together with conduit 116 positioned at the second end 24 of the frame 20 aids in the ascertainment of the position and direction of travel of the apparatus 10 when the apparatus is on the bottom 14 of the pond 12.

FIG. 4 illustrates a side view of the apparatus of the invention. The hydrostatic chamber 40 is in an up position. Articulating means 120 raises and lowesr the hydrostatic chamber 40 relative to the bottom 14 of the pond 12 by pivoting the chamber 40 attached to a supporting frame 41 about hinge 23. This enables the hydrostatic chamber 40 to be positioned at any predetermined position from the bottom 14 of the pond within the limits of movement of the articulating means 120. As illustrated, the hydrostatic chamber 40 is pivotally attached to the first end 22 of frame 20 by hinge 23. Other means to enable vertical movement of chamber 40 are known to those skilled in the art. Thus for relatively deep sediment layers, the chamber may be spaced apart from the bottom of the pond of a first pass and in a completely down position in a second pass over the layer. The apparatus of the invention 10 enables the removal of a relatively constant thickness sediment layer with ease since the settings of pump speed (suction), rate of travel F and the extent the door 66 is open remain relatively constant as the apparatus moves along the bottom of a pond while obtaining a viscous slurry.

Figure 5:
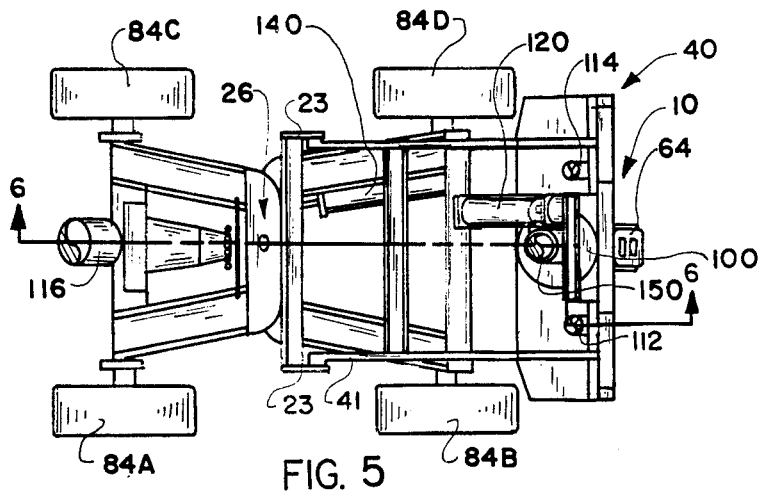
FIG. 5 is a top view of the apparatus of the invention.

FIG. 5 illustrates a top view of the apparatus of the invention 10. The second articulating means 140 in combination with the pivot means 25 enables the apparatus 10 to be steered along the bottom of the pond. Other means for steering the apparatus are within those skilled in the art. The input port 102 of pump means 100 is in fluid communication with hydrostatic chamber 40 and provides suction of chamber 40 to provide a pressure within chamber 40 lower than outside of chamber 40. The slurry "S" moves into the input port 102 and is discharged through output port 104 of the pump means 100 to a disposal area "D".

Figure 6:
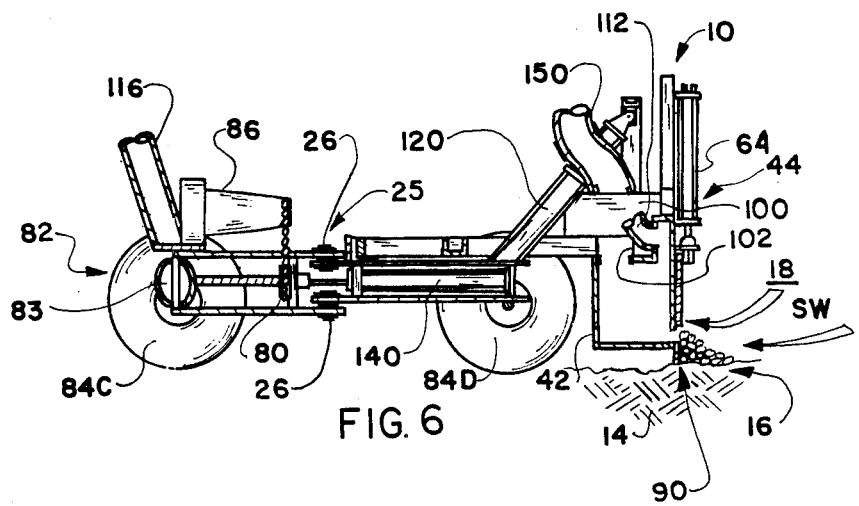
FIG. 6 is a partial cross section take along line 6—6 of FIG. 5.

FIG. 6 illustrates a partial section of the apparatus of the invention 10. The motive means 80 is operatively attached to a transmission 83 for rotatably driving at least one wheel of the plurality of wheels 82. Operatively positioning the input port 102 above the aperture 50 of chamber 40 also tends to increase the residence time of the incoming sediment and water within the chamber 40 which ensures a greater mixing of the sediment and water to form a more homogenous slurry "S". The input port 102 of pump means 100 may be operatively connected to chamber 40 be means of a conduit.

Preferably, the first articulating means 120, the second articulating means 140 and the control means 64 for moving door 66 of the gate means are hydraulic rams 121, 142 and 65, respectively.

Other implements than a wiper means 90 may be used with the apparatus of the invention 10. For example, a rake means and a blade means or the like may be operatively positioned proximate the aperture 50 to aid in directing the sediment layer, vegetation or the like toward the aperture 50 formed in the hydrostatic chamber 40 for removal from the bottom of the pond to a disposal site. These additional implements may be used together or alone.

Figures 7, 8:
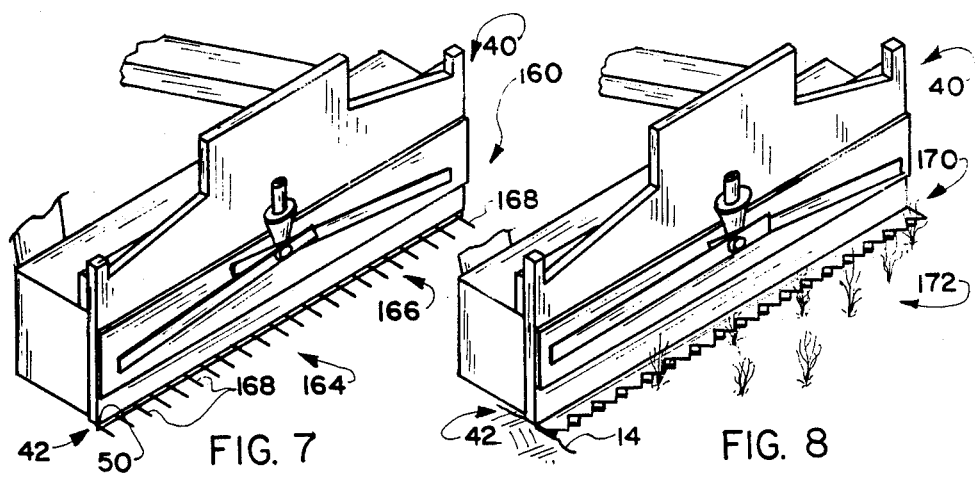
FIG. 7 is a partial isometric view of the apparatus of the invention with a rake means.
FIG. 8 is a partial isometric view of the apparatus of the invention with a blade means.

FIG. 7 illustrates the first end 42 of the hydrostatic chamber 40 with a rake means 160. Prefeably the rake means extends obliquely downward to enable in use a scraping and loosening of the bottom sediment layer 16 of the pond 12 proximate the aperture 50 upon movement of the frame by the motive means. The rake means in use also directs the scraped and loosened bottom sediment layer toward the aperture. The rake means is preferably secured to the first end 42 of the hydrostatic chamber 40. Preferably, the rake means 160 is a rake 164 having a plurality of prongs 166 secured to the first end 42 of the hydrostatic chamber 40 and with each prong 168 of the plurality of prongs 166 extending obilquely downwardly from the hydrostatic chamber to enable the prongs in use to pierce into and separate the sedimentary layer from the bottom of the pond.

FIG. 8 illustrates a blade means 170 for mowing vegetation 172 growing on the bottom 14 of the pond 12 proximate the aperture 50 upon movement of the frame by the motive means. This enables the aperture 50 to receive the cut vegetation for removal from the bottom of the pond 14 together with sediment 16. The blade means 170 is preferably secured to the first end 42 of the hydrostatic chamber 40. The blade means 170 includes a vibrating blade, a reciprocating blade and the like known to those skilled in the art. The blade 170 extends outwardly from the hydrostatic chamber 40 such that the blade is perpendicular to the vegetation in use.

The present disclosure includes that contained in the appended claims as well a that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for removing a layer of sediment which has settled on the bottom of a pond; comprising:
   a frame being submersible in the pond;
   motive means for moving said frame along the bottom of the pond;
   a hydrostatic chamber being positioned on said frame;
   said hydrostatic chamber having an aperture formed therein for receiving a mixture of sediment and water from the bottom of the pond;
   vent means for venting said hydrostatic chamber to atmospheric pressure;
   pump means in fluid communication with said hydrostatic chamber to create a reduced pressure in said hydrostatic chamber relative to pressure exterior to said hydrostatic chamber for drawing the sediment and water mixture through said aperture into said hydrostatic chamber to form a slurry therein and for removing said slurry from said hydrostatic chamber for disposal away from said pond;

said aperture in said hydrostatic chamber being substantially rectangular in shape with a long side of said rectangular shape being substantially parallel to the bottom of the pond; and gate means extending parallel to and proximate said pond bottom for controlling the opening size of said aperture in said hydrostatic chamber and for regulating the ratio of sediment to water removed from the bottom of the pond.

2. The apparatus of claim 1, wherein said gate means control said opening size of said aperture in said hydrostatic chamber by varying said opening along the entire length of said aperture along said long side of said rectangular shaped aperture.

3. The apparatus of claim 1, wherein said gate means for controlling the opening size of said aperture formed in said hydrostatic chamber includes a hydraulically operated door.

4. The apparatus of claim 1, including a wiper means attached below said aperture and being coextensive with said long side of said aperture formed in said hydrostatic chamber; and said wiper means extending into the sediment layer for loosening the bottom sediment layer upon movement of said frame by said motive means thereby directing the bottom sediment toward said aperture.

5. The apparatus of claim 4, wherein said wiper means includes a resilient wiper.

6. The apparatus of claim 1, including rake means having a plurality of prongs attached below said aperture and being coextensive with said long side of said aperture formed in said hydrostatic chamber; and said rake means extending into the sediment layer for loosening the bottom sediment layer upon movement of said frame by said motive means thereby directing the bottom sediment toward said aperture.

7. The apparatus of claim 1, including a blade means attached below said aperture and being coextensive with said long side of said aperture formed in said hydrostatic chamber; and said blade means mowing vegetation growing on the bottom of the pond upon movement of said frame by said motive means.

8. The apparatus of claim 1, including a first articulating means for enabling said hydrostatic chamber to move vertically relative to said frame to enable an upward and downward manipulation of said aperture of said hydrostatic chamber relative to the bottom of the pond.

9. The apparatus of claim 8, including pivot means for pivoting a first end of said frame relative to a second end of said frame; and a second articulating means for pivoting said first end of said frame relative to said second end of said frame for controlling the direction of movement of said frame along the bottom of the pond.

10. The apparatus of claim 9, wherein said first and second articulating means are hydraulically actuated.

11. The apparatus of claim 1, wherein said pump means includes a hydraulically operated pump secured to said frame.

* * * * *